United States Patent Office 2,982,905
Patented May 2, 1961

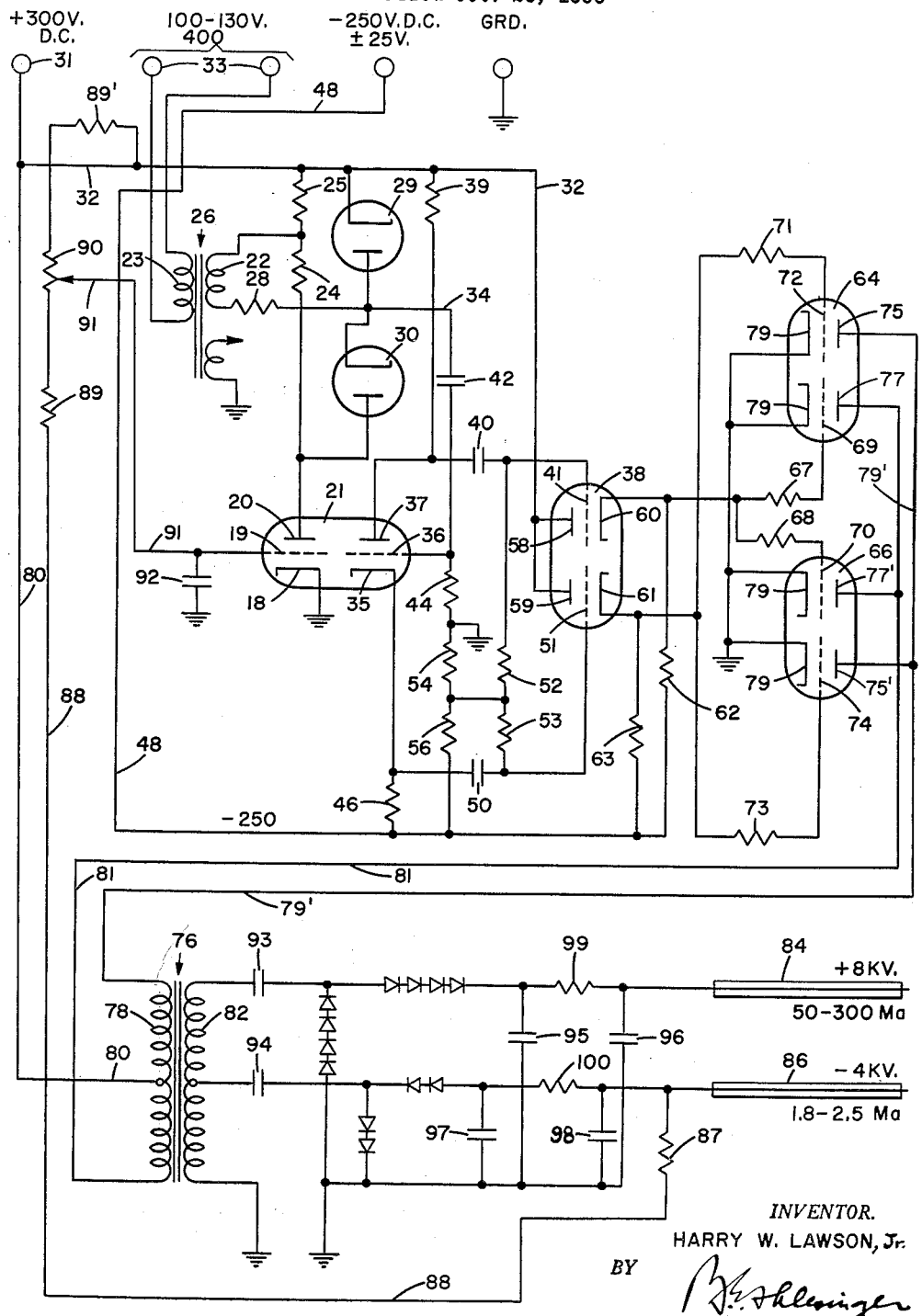

2,982,905
REGULATED HIGH VOLTAGE D.C. POWER SUPPLY

Harry W. Lawson, Jr., Avon, N.Y., assignor to Caledonia Electronics and Transformer Corporation, Caledonia, N.Y., a corporation of New York Filed Oct. 26, 1956, Ser. No. 618,555

8 Claims. (Cl. 321—18)

This invention relates to a circuit for obtaining a regulated high voltage D.C. power supply from an unregulated A.C. source.

Some high intensity tubes require closely held voltage. For example, it may be necessary to regulate the voltage input to a 4000-volt tube within 1%. Frequently, the only available power supply is low-frequency A.C., so there is a serious problem of converting to D.C. at the required voltage level and with the proper regulation over the range of no load to full load. The problem is particularly acute in high-altitude work, where any supply circuit must be compact and of light weight.

Power supply circuits based on pentode oscillators have been used to produce a high voltage D.C. supply output with limited amplification and limited regulation. In such circuits, the oscillator output voltage usually has been led into the D.C. supply and a high voltage transformer. The output voltage from the transformer has been compared with the desired voltage, and the error has been fed back into the amplifier and control oscillator by varying the voltage on the pentode screen grid. Regulation obtained in this manner has been limited because an oscillator will only operate within certain limits of amplitude.

An object of the present invention is to provide a high voltage D.C. power supply having close regulation from no load to full load.

A related object of the invention is to provide a regulated high voltage D.C. power supply that is light and compact for use at high altitudes.

Another object of the invention is to provide a regulated power supply capable of maintaining one or more sources of substantially constant D.C. voltage despite relatively wide variations in the available A.C. voltage and/or in a negative D.C. supply voltage.

The foregoing objects of the invention are achieved in the illustrated embodiment of the invention by employing means that is responsive to deviations in the D.C. output voltage to control the magnitude of the A.C. input. The circuit consists essentially of a modulator circuit that controls the input to a power amplifier in the audio frequency range that supplies audio frequency power to a high voltage transformer, the output of which is rectified and compared with a reference voltage. The resultant voltage is applied to the grid of a control tube in the modulator circuit. The audio frequency A.C. input is applied to the modulator circuit, and the modulator circuit is controlled by the control tube in such a way that a change in the rectified D.C. output voltage produces a change in the audio frequency voltage input to the audio amplifier in such a direction as to change the audio amplifier output to correct for the deviation from the desired voltage.

The invention will be most readily understood from a consideration of the following detailed description of a preferred embodiment that is illustrated in the accompanying diagrammatic single figure of drawing.

Referring now to the drawing, there is shown a regulated power supply particularly adapted for use in high altitude work where an audio frequency A.C. line voltage is available that is subject to wide variations. Included in the power supply are the several circuits and circuit components, including a modulator circuit, a power amplifier, a high voltage transformer, and a rectifier.

The modulator circuit includes the cathode 18, grid 19, and a plate 20 of one-half of a twin-triode type tube 21, such as the 12AT7, a pair of series-connected equal 4700 ohm resistors 24 and 25, a power transformer 26, a 100K load resistor 28 that is connected in series with the secondary 22 of the transformer, and a pair of series-connected diode rectifiers 29 and 30. The series-connected secondary 22 of the transformer 26 and the load resistor 28 are connected between the junctions respectively of the two resistors 24 and 25 and of the two diode rectifiers 29 and 30. The plate of the diode 30 and the resistor 24 are connected to the plate 20 of the triode. The resistor 25 and the cathode of diode 29 are connected to a line 32 that is connected to a regulated positive potential D.C. supply (not shown) but denoted at 31.

The input audio frequency voltage is supplied from a source denoted at 33 to the primary 23 of the transformer 26 and is applied by the transformer 26 between the resistor 28 and the junction of the equal resistors 24 and 25. Output from the modulator circuit appears on the line 34 that is connected to the junction between the load resistor 28 and the two diode rectifiers 29 and 30 respectively.

The output from the modulator circuit is applied to the audio amplifier circuit. This circuit includes the cathode 35, grid 36, and plate 37 of the other half of the twin-triode type tube 21, connected as a phase inverter for the first power-amplifier stage of the amplifier circuit, that is provided by the twin-triode type tube 38. The plate 37 is connected through an 82K, 1 w. resistor 39 with the regulated positive potential D.C. supply line 32, and through a 0.01 μfd. coupling capacitor 40, with one grid 41 of the tube 38. The grid 36 is connected through a 0.01 μfd. coupling capacitor 42 with the output line 34 from the modulator circuit; and through a 2.7M resistor 44 with ground (a point of zero reference potential). The cathode 35 is connected through a 1 w., 82K resistor 46 with a line 48 that is connected to a negative potential D.C. supply; and through a 0.01 μfd. coupling capacitor 50 to the second grid 51 of the tube 38.

The tube 38 may be a 12AT7 twin-triode type tube and is connected as a cathode follower with the second, push-pull stage of amplification. The two grids 41 and 51 respectively of the tube 38 are interconnected externally of the tube by a pair of equal, series-connected 2.7M resistors 52 and 53, the junction between which is interconnected through a 27K resistor 54 to ground, and through a 1 w., 240K resistor 56 to the negative D.C. supply line 48. The two plates 58 and 59 respectively are connected through the line 32 to the regulated positive D.C. supply. The cathodes 60 and 61 are separately connected through the 82K resistors 62 and 63 respectively to the negative D.C. supply line 48, and through 100 ohm resistors to the grids of the tubes in the second stage of the amplifier circuit.

The second stage of amplification is provided by a pair of twin-triode type tubes 64 and 66 respectively, operating in parallel. Each of these tubes may be of type 5687. The cathode 60 of the tube 38 is connected through a 100 ohm resistor 67 with one grid 69 in the tube 64 and through a second and equal resistor 68 with the grid 70 in the tube 66. The cathode 61 of the tube 38 is connected through a 100 ohm resistor 71 with the second grid 72 in the tube 64, and through a second and equal resistor 73 with the second grid 74 in the tube 66. The four cathodes 79 of the tubes 64 and 66 are each connected directly to ground. The two plates 75 and 75' of the tubes 64 and 66, respectively, are connected in parallel by line 79' to one end of the primary 78 of the high voltage transformer 76, and the other two plates 77 and 77' of the tubes 64 and 66 are connected in parallel by line 81 to the opposite end of the primary 78 of this transformer. The primary 78 has a center-tap 80 that connects with the positive potential D.C. supply line 32.

The secondary 82 of the transformer is connected to a conventional rectifier and filter circuit 16 that provides a positive terminal 84 at one high D.C. voltage and, as well, an intermediate tap 86 at a desired negative voltage.

To regulate closely the negative voltage at the tap 86, the tap 86 is connected through a potentiometer to the grid 19 of the control triode in the modulator circuit. The potentiometer circuit includes a 74 megohm resistor 87 that is connected at one end to the tap 86 and at its opposite end through a line 88 to a smaller 3.9 megohm resistor 89 that is series connected to a preset 5 megohm rheostat 90; the rheostat is connected through its opposite terminal through a 3.9 megohm resistor 89' to the positive D.C. supply line 32, and through its preset tap 91 to the grid 19 of the modulator circuit control tube.

A 0.1 μfd. capacitor 92 is interposed between the grid 19 and the ground.

The operation of the power supply may be most readily understood by assuming certain values of voltages for discussion purposes, such as those shown in the drawing. Component values for a typical system have been indicated in this description and it will be understood that the values stated are illustrative, for discussion purposes, and not limiting. All resistors whose values are not specified may be one-half watt. The indicated capacitances in μfd. are for 600 v. D.C. or greater.

Typical values of the components of the rectifier and filter circuit are as follows:

Capacitor 93 _____ 1×0.0068 μfd. at 5 kv.
Capacitor 94 _____ 2×0.0068 μfd. at 5 kv.
Capacitors 95 and 96 _____ 2×0.00047 μfd. at 10 kv.
Capacitors 97 and 98 _____ 2×0.0068 μfd. at 5 kv.
Resistor 99 _____ 2.2M, 1 w.
Resistor 100 _____ 68K, 1 w.

The audio frequency voltage transformer 26 may be W-2070-1. The high voltage transformer 76 may be W-2070-2.

To demonstrate the operation of the power supply, assume that the available A.C. line voltage has a nominal frequency of 400 c.p.s. but may vary +10%, and that it has a nominal voltage of 110, but may vary between 100 and 130; and that it is desired to provide a regulated power supply capable of maintaining two derived D.C. supply voltages, one at +8kv., +0 to —500 volts, from no load to a current drain up to about 300 μa, and a second at —4 kv., ±1%, from no load to a current drain up to about 2.5 ma. Assume further an instant when the regulated power supply is in use, and the voltage on tap 86 begins to shift from —4000 v. in a more negative direction. Through the preset tap 91, the voltage drop across one arm of the potentiometer, formed by a part of the resistor 90 and the resistor 89', to the regulated positive D.C. voltage supply line 32, is constantly compared with the voltage drop across the second arm of the potentiometer, formed by a part of the resistor 90, the resistor 89, the line 88 and the large resistor 87, to the tap 86; and a resultant voltage is impressed on the grid 19 through the tap 91. As the output voltage on the tap 86 goes more negative, the resultant voltage is modified by an amount that is directly proportional to the error or deviation, and is thus impressed on the grid 19.

The grid 19 controls the current flow between the cathode 18 and the plate 20, and thus controls the voltage drop across the resistors 24 and 25. The audio frequency voltage is applied by the transformer 26 between the resistor 28 and the junction of the resistors 24 and 25. The resistor 28 serves as a limiting resistor to insure minimum current for the diode rectifiers 29 and 30 to operate. The resistors 24 and 25 control the bias and determine when the diodes 29 and 30 conduct, and also load the modulator circuit so that the control triode will always respond in proportion to its grid voltage.

When the grid 19 goes more negative, less current is conducted by the triode between the cathode 18 and the plate 20. This changes the bias on the diodes 29 and 30, causing them to conduct earlier, and decreasing the A.C. output voltage of the modulator circuit on the line 34. The modulator circuit is resistance-coupled through the phase inverter half of the twin-triode tube to the first stage of the audio amplifier that includes the twin-triode tube 38, which provides power amplification. The twin-triode tube 38 is connected as a cathode follower with the second, push pull stage, that provides voltage amplification. As the output voltage of the modulator circuit decreases, the output of the audio amplifier circuit is caused to decrease, and the output voltage at the tap 86 is returned to —4000 v.

The rectifier and filter circuit eliminates ripple voltage because the filter capacitors are kept charged to the desired voltage.

There is thus provided a vacuum tube regulator circuit in which all of the regulator tubes are operated at a low voltage for ease in mounting, maintenance, and replacement. For compactness and to protect high-voltage components against the hazards of moisture or rarified air, the assembly, exclusive of the tubes, may be cast in a suitable casting resin, such as, for example, an epoxy resin.

It is to be understood that the component values for the typical system, and the voltages assumed, are illustrative only, and that equivalent components and component values may be substituted by those skilled in the art to achieve like results. The operating range of the supply is limited only by the limitations of the control tube in the modulator circuit since the supply has an infinite dynamic range.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the esesntial features hereinbefore set forth, and as fall within the scope of the invention or the limits of the appended claims.

Having thus described my invention what I claim is:

1. A power supply for deriving a regulated D.C. voltage from an A.C. line whose line voltage is subject to relatively wide variation, comprising an A.C. voltage amplitude modulator circuit having two unidirectional amplitude sensitive devices mounted in parallel but electrically reversed with reference to one another, means for applying at least a portion of said A.C. line voltage to said modulator circuit, an electron discharge device having at least an anode, a cathode, and a control electrode, means coupling the anode of said electron discharge device with said amplitude sensitive devices to operate with said devices to produce modulated A.C. of predetermined voltage whose value is a function of the current flowing in the anode-cathode path of said electron discharge device, rectifier means, means for applying the output of said modulator circuit to said rectifier means, output terminals on said rectifier means to which a variable current load may be connected, and means connecting at least one of said output terminals to said control electrode and operating automatically in response to changes in the voltage appearing at said terminal for applying a variable voltage to said control electrode.

2. A power supply for deriving a regulated high D.C. voltage from an A.C. line whose line voltage is a variable audio frequency and is subject to relatively wide variation in amplitude comprising, an A.C. voltage amplitude modulator circuit having two unidirectional amplitude sensitive devices mounted in parallel but electrically reversed with reference to one another, means for applying at least a portion of said A.C. line voltage to said modulator circuit, an electron discharge device having at least an anode, a cathode, and a control electrode, means coupling the anode-cathode path of said electron discharge device with said amplitude sensitive devices to operate with said devices to produce modulated A.C. in said modulator circuit of predetermined voltage whose value is a function of the current flowing in the anode-cathode path of said electron discharge device, audio amplifier means, means for applying the output of said modulator circuit to said audio amplifier means, rectifier means, means for applying the output of said audio amplifier circuit to said rectifier means, output terminals on said rectifier means to which a variable current load may be connected, a source of regulated uni-directional low voltage, means for comparing the voltage on at least one of said output terminals with the voltage of the source of regulated uni-directional low voltage to obtain a resultant voltage that varies as the voltage at the output terminal deviates from the desired regulated voltage, and means for applying said resultant voltage to said control electrode.

3. A power supply for deriving a regulated high D.C. voltage from an A.C. line whose line voltage is of audio frequency and is subject to relatively wide amplitude variation, comprising an A.C. voltage amplitude modulator circuit having two uni-directional amplitude sensitive devices mounted in parallel but electrically reversed with reference to one another, means for applying at least a portion of said A.C. line voltage to said modulator circuit, an electron discharge device having at least an anode, a cathode, and a control electrode, means coupling the anode-cathode path of said electron discharge device with said amplitude sensitive devices to operate with said devices to produce modulated A.C. in said modulator circuit of predetermined voltage whose value is a function of the current flowing in the anode-cathode path of said electron discharge device, audio amplifier means, means for applying the output of said modulator circuit to said audio amplifier means, rectifier means, means for applying the output voltage of said audio amplifier circuit to said rectifier means, output terminals on said rectifier means to which a variable current load may be connected, a source of regulated uni-directional low voltage, a resistance of high value connected between at least one of said output terminals and said source of regulated uni-directional low voltage, a tap set at a point on said resistance to compare the voltage of said output terminal with the voltage of the source of regulated uni-directional low voltage and to produce a resultant voltage that varies as the voltage of said output terminal deviates from the desired regulated voltage, and means for applying said resultant voltage to said control electrode.

4. A power supply for deriving a regulated high D.C. voltage from an A.C. line whose line voltage is of audio frequency and is subject to relatively wide variation in voltage, comprising: an A.C. voltage amplitude modulator circuit including the secondary of a power transformer, means connecting a first diode across said secondary, means connecting a second diode across said secondary in parallel with said first diode but electrically reversed relative thereto to conduct uni-directionally in opposition to said first diode, means for applying at least a portion of said A.C. line voltage to said secondary, an electron discharge device having at least an anode, a cathode, and a control electrode, means coupling the anode of said electron discharge device with said diodes to operate with said diodes to produce modulated A.C. in said modulator circuit of predetermined voltage whose value is a function of the current flowing in the anode-cathode path of said electron discharge device, audio amplifier means, means for applying the output of said modulator circuit to said audio amplifier means, rectifier means, means for applying the output of said audio amplifier means to said rectifier means, output terminals on said rectifier means to which a variable current load may be connected, a source of regulated uni-directional low voltage, means for comparing the voltage of said output terminal with the voltage of the source of regulated uni-directional low voltage to obtain a resultant voltage that varies as the voltage at the output terminal deviates from the desired regulated voltage, and means for applying said resultant voltage to said control electrode.

5. A power supply for deriving a regulated high D.C. voltage from an A.C. line whose line voltage is of audio frequency and is subject to relatively wide variation in voltage, comprising: an A.C. voltage amplitude modulator circuit including the secondary of a power transformer, means connecting a first diode across said secondary, means connecting a second diode across said secondary in parallel with said first diode but electrically reversed relative thereto to conduct uni-directionally in opposition to said first diode, means for applying at least a portion of said A.C. line voltage to said secondary, an electron discharge device having at least an anode, a cathode, and a control electrode, means coupling the anode of said electron discharge device to said diodes to operate with said diodes to produce modulated A.C. in said modulator circuit of predetermined voltage whose value is regulated in indirect proportion to the current flowing in the anode-cathode path of said electron discharge device, audio amplifier means, means for applying the output of said modulator circuit to said audio amplifier means, rectifier means, means for applying the output of said audio amplifier means to said rectifier means, output terminals on said rectifier means to which a variable current load may be connected, a source of regulated uni-directional low voltage, a resistance of high value connected between at least one of the said output terminals and said source of uni-directional low voltage, a tap set at a point on said resistance to compare the voltage at the output terminal with the voltage of said source of regulated uni-directional low voltage and to produce a resultant voltage that varies as the voltage at the output terminal deviates from the desired regulated voltage, and means for applying said resultant voltage to said control electrode.

6. A power supply for deriving a regulated high D.C. voltage from an A.C. line whose line voltage is of audio frequency and is subject to relatively wide variation in voltage, comprising: an A.C. voltage amplitude modulator circuit including the secondary of a power transformer, a load resistor series-connected with said secondary, means connecting a first diode and a first load resistor across said secondary, means connecting a second diode and a second, equal load resistor across said secondary, said diodes being connected in parallel but in electrically reversed relationship with one another to conduct uni-directionally in opposition, said first and second load resistors serving respectively to bias each said diode to conduct at a predetermined value, means for applying at least a portion of said A.C. line voltage to said secondary, a source of regulated, positive potential uni-directional current, an electron discharge device having at least an anode, a cathode, and a control electrode, means coupling the anode of said electron discharge device with said diodes to operate with said diodes to produce modulated A.C. in said modulator circuit of predetermined voltage whose value is in indirect proportion to the current flowing in the anode-cathode path of said electron discharge device, means coupling said source of uni-directional current in said modulator circuit, audio amplifier means, means for applying the output of said modulator circuit to said audio amplifier means, rectifier means, means for applying the output of said audio amplifier means to said rectifier means, output terminals on said rectifier means to which a variable current load may be connected, a resistance of high value connected between at least one of the said output terminals and said source of unidirectional low voltage, a tap set at a point on said resistance to compare the voltage at the output terminal with the voltage of said source of regulated unidirectional low voltage and to produce a resultant voltage that varies as the voltage at the output terminal deviates from the desired regulated voltage, and means for applying said resultant voltage to said control electrode.

7. A self-regulating circuit for use with a source of A.C. voltage of varying value, comprising a modulator circuit including two unidirectional amplitude sensitive devices which are mounted in parallel but in electrically reversed relation, and means to bias each to conduct at a predetermined voltage value, means for applying at least a part of said source voltage to said modulator circuit, an electron discharge device having at least an anode, a cathode, and a control electrode, means coupling said anode with said amplitude sensitive devices to operate with said devices and said biasing means to produce a modulated A.C. output voltage whose value is a function of the current flowing in the anode-cathode path of said electron discharge device, a source of unidirectional current for supplying a reference voltage, means to compare said output with said reference voltage, and means operable from said output to regulate said control electrode in accordance with the comparison to control the current in said anode-cathode path from said output.

8. A power supply for deriving a regulated D.C. voltage from an A.C. line whose line voltage is subject to relatively wide variation, comprising a modulator circuit having two unidirectional amplitude sensitive devices mounted in parallel but in electrically reversed relation, and means to bias each device to conduct at a predetermined voltage value to produce a modulated A.C. output, means for applying at least a portion of said A.C. line voltage to said modulator circuit, means operatively coupled with said modulator circuit for amplifying and rectifying said modulated A.C. output to produce a D.C. voltage, and means operable from said D.C. voltage to control the A.C. output of said modulator circuit.

References Cited in the file of this patent

UNITED STATES PATENTS

| | | |
|---|---|---|
| 2,446,188 | Miller | Aug. 3, 1948 |
| 2,565,621 | Olson | Aug. 28, 1951 |
| 2,567,797 | Anderson | Sept. 11, 1951 |
| 2,683,852 | Sampson | July 13, 1954 |